(12) United States Patent
Minezawa et al.

(10) Patent No.: US 9,943,806 B2
(45) Date of Patent: Apr. 17, 2018

(54) EXHAUST GAS PURIFICATION SYSTEM

(71) Applicant: ISUZU MOTORS LIMITED, Tokyo (JP)

(72) Inventors: Masanobu Minezawa, Fujisawa (JP); Kouji Sakumoto, Fujisawa (JP); Shinji Hara, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/304,828

(22) PCT Filed: Apr. 16, 2015

(86) PCT No.: PCT/JP2015/061732
§ 371 (c)(1),
(2) Date: Oct. 17, 2016

(87) PCT Pub. No.: WO2015/159954
PCT Pub. Date: Oct. 22, 2015

(65) Prior Publication Data
US 2017/0043295 A1 Feb. 16, 2017

(30) Foreign Application Priority Data

Apr. 16, 2014 (JP) ................................. 2014-084620

(51) Int. Cl.
*F01N 3/20* (2006.01)
*B01D 53/94* (2006.01)
(Continued)

(52) U.S. Cl.
CPC ......... *B01D 53/9495* (2013.01); *B01D 53/94* (2013.01); *B01D 53/9418* (2013.01);
(Continued)

(58) Field of Classification Search
CPC .......... F01N 3/208; F01N 11/007; F01N 3/08; F01N 2550/02; B01D 53/94; B01D 53/9431; B01D 53/9495
(Continued)

(56) References Cited

U.S. PATENT DOCUMENTS

2011/0258989 A1   10/2011   Hirota et al.
2015/0275733 A1   10/2015   Matsumoto et al.

FOREIGN PATENT DOCUMENTS

EP     2025388 A1     2/2009
JP     2003-293738 A  10/2003
(Continued)

OTHER PUBLICATIONS

Office Action for Japanese Patent Application No. 2014-084620 dated Sep. 4, 2017; 8 pages.
(Continued)

*Primary Examiner* — Tom P Duong
(74) *Attorney, Agent, or Firm* — Procopio, Cory, Hargreaves & Savitch LLP

(57) ABSTRACT

The exhaust gas purification system includes a SCR, an NOx sensor which is provided on a downstream side of the SCR, and an NOx purifying controller which controls an amount of urea water being ejected to the SCR and performs an abnormality diagnosis based on a detection value of the NOx sensor, wherein the exhaust gas purification system includes an exhaust gas temperature sensor which acquires temperature of the exhaust gas flowing into the SCR, a temperature increasing rate calculating unit which calculates a temperature increasing rate at which the exhaust gas temperature acquired by the exhaust gas temperature sensor reaches a second temperature from a predetermined first temperature, and a prohibiting unit which prohibits abnormality diagnosis by the NOx purifying controller in a case in which the (Continued)

temperature increasing rate calculated by the temperature increasing rate calculating unit is higher than a predetermined determination threshold value.

10 Claims, 5 Drawing Sheets

(51) Int. Cl.
*F01N 3/08* (2006.01)
*F01N 11/00* (2006.01)
(52) U.S. Cl.
CPC ........... *B01D 53/9431* (2013.01); *F01N 3/08* (2013.01); *F01N 3/20* (2013.01); *F01N 3/208* (2013.01); *F01N 11/002* (2013.01); *F01N 11/007* (2013.01); *F01N 2550/02* (2013.01); *F01N 2550/05* (2013.01); *F01N 2560/026* (2013.01); *F01N 2560/06* (2013.01); *F01N 2610/02* (2013.01); *F01N 2900/1402* (2013.01); *F01N 2900/1404* (2013.01); *F01N 2900/1602* (2013.01); *Y02C 20/10* (2013.01); *Y02T 10/24* (2013.01); *Y02T 10/47* (2013.01)

(58) Field of Classification Search
USPC ................................... 422/168; 60/286, 299
See application file for complete search history.

(56) References Cited

FOREIGN PATENT DOCUMENTS

| JP | 2006-242094 A | 9/2006 |
|----|---------------|--------|
| JP | 2006-274844 A | 10/2006 |
| JP | 2006342734 A | 12/2006 |
| JP | 2010180847 A | 8/2010 |
| JP | 2010-248925 A | 11/2010 |
| JP | 2012-036835 A | 2/2012 |
| JP | 2013-181411 A | 9/2013 |
| WO | 2013032390 A1 | 3/2013 |
| WO | 2014088101 A1 | 6/2014 |

OTHER PUBLICATIONS

International Search Report for PCT App No. PCT/JP2015/061732 dated Sep. 20, 2017; 5 pages.
International Search Report and Written Opinion for PCT App No. PCT/JP2015/061732 dated Jul. 7, 2015, 12 pgs.

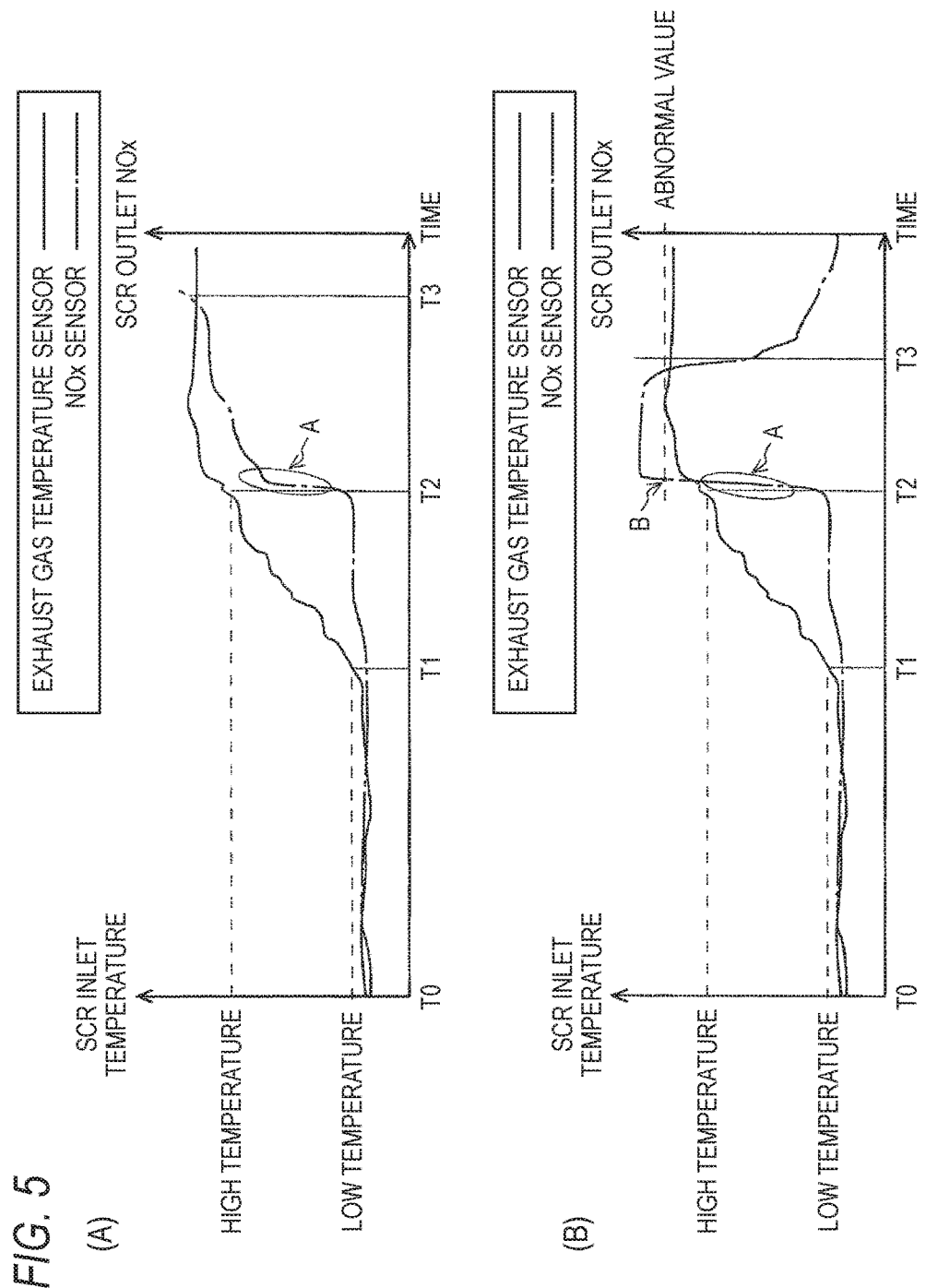

EXHAUST GAS PURIFICATION SYSTEM

CROSS-REFERENCE TO RELATED APPLICATIONS

This application is a U.S. National Stage entry of PCT Application No. PCT/JP2015/061732, filed on Apr. 16, 2015, which claims priority to JP Application No. 2014-084620 filed Apr. 16, 2014. The contents of the foregoing are incorporated by reference.

TECHNICAL FIELD

The invention relates to an exhaust gas purification system, and particularly, to an exhaust gas purification system including a selective catalytic reduction (hereinafter, SCR) which reduces and purifies NOx in exhaust gas.

BACKGROUND ART

In the related art, exhaust gas purification systems including SCRs which selectively reduce and purify NOx in exhaust gas using ammonia (hereinafter, NH3) generated by hydrolysis from urea water as a reducing agent are known. In such exhaust gas purification systems, an amount of urea water being ejected is feedback-controlled so that a value of NOx in the exhaust gas reaches a target value based on a sensor value of an NOx sensor provided on an exhaustion downstream side of the SCR (for example, refer to Patent Literature 1 and Patent Literature 2).

CITATION LIST

Patent Literature

[Patent Literature 1] JP-2003-293738
[Patent Literature 2] JP-A-2013-181411

SUMMARY OF INVENTION

Technical Problem

However, there is a tendency that an absorbable amount of NH3 of a SCR is decreased in accordance with increasing of a catalyst temperature. Therefore, when an exhaust gas temperature is rapidly increased due to forced regeneration, or the like of a diesel particulate filter (hereinafter, DPF), there is a possibility of occurrence of so called NH3 slip in which NH3 is partially separated from the SCR and is discharged to a downstream side.

Since a general NOx sensor is not capable of distinguishing the NOx from the NH3, when the NH3 slip occurs, the NOx sensor indicates a high NOx value. Therefore, in a system of feedback-controlling an amount of urea water being ejected based on a sensor value of the NOx sensor, there is a possibility that the NH3 slip is falsely recognized as discharging of excess NOx and the amount of urea water being ejected is excessively increased, and there is a problem in that additional NH3 slip occurs. In addition, in a system for performing an abnormality diagnosis, or the like based on the sensor value of the NOx sensor, the NH3 slip is falsely recognized as discharging of the excess NOx, and thus there is a problem in that misdiagnosis such as stop of ejecting the urea water or issuing an abnormal alarm occurs.

An object of the invention is to provide an exhaust gas purification system which is capable of effectively preventing the NH3 slip or the misdiagnosis when the exhaust gas temperature is rapidly increased.

Solution to Problem

In order to solve, the above-described object, an exhaust gas purification system of the invention includes: a selective catalytic reduction which is provided on an exhaust gas passage of an internal combustion engine and purifies NOx in exhaust gas by using ammonia generated from urea water as a reducing agent; an NOx sensor which is provided on the exhaust gas passage on downstream side further than the selective catalytic reduction; and control means for controlling an amount of urea water being ejected to the selective catalytic reduction and performing an abnormality diagnosis based on a detection value of the NOx sensor, characterized in that: the exhaust gas purification system includes: exhaust gas temperature acquiring means for acquiring temperature of the exhaust gas flowing into the selective catalytic reduction; temperature increasing rate calculating means for calculating a temperature increasing rate at which an exhaust gas temperature acquired by the exhaust gas temperature acquiring means reaches a predetermined second temperature, which is higher than a predetermined first temperature, from the first temperature; and prohibiting means for prohibiting the abnormality diagnosis by the control means in a case in which the temperature increasing rate calculated by the temperature increasing rate calculating means is higher than a predetermined determination threshold value.

Further, it is preferable that the exhaust gas purification system further includes low temperature determination means for calculating an average temperature obtained by averaging exhaust gas temperatures acquired within a predetermined period by the exhaust gas temperature acquiring means, and determining that the temperature is stabled at a low temperature when the average temperature is equal to or less than the first temperature, and the temperature increasing rate calculating means starts calculating of the temperature increasing rate when the low temperature determination means determines that the temperature is stabled at a low temperature and the exhaust gas temperature acquired by the exhaust gas temperature acquiring means exceeds the first temperature.

Further, it is preferable that the exhaust gas purification system further includes decreasing means for decreasing the amount of urea water being ejected by the control means in a case in which the temperature increasing rate calculated by the temperature increasing rate calculating means is higher than a predetermined determination threshold value, and the prohibiting means continuously performs prohibition of the abnormality diagnosis for a predetermined period set according to the average temperature, and the decreasing means continuously performs decreasing of the amount of urea water being ejected for the predetermined period set according to the average temperature.

Further, it is preferable that the prohibiting means does not perform prohibition of the abnormality diagnosis in a case in which the exhaust gas temperature acquired by the exhaust gas temperature acquiring means does not reach the second temperature from the first temperature within a predetermined waiting time, and the decreasing means does not perform decreasing of the amount of urea water being ejected in a case in which the exhaust gas temperature acquired by the exhaust gas temperature acquiring means does not reach the second temperature from the first temperature within a predetermined waiting time.

Further, it is preferable that the second temperature is set to a lower temperature than a temperature at which ammonia adsorbed to the selective catalytic reduction is at least partially separated and slipped.

In an exhaust gas purification system of the related art, when an exhaust gas temperature is rapidly increased, (A) of FIG. 5 is a chart diagram describing a case in which urea water is continuously ejected based on a sensor value of an NOx sensor, and (B) of FIG. 5 is a chart diagram describing a case in which the NOx sensor detects an abnormal value and urea water ejection is stopped.

DESCRIPTION OF EMBODIMENTS

Hereinafter, an exhaust gas purification system according to an embodiment of the invention will be described based on attached drawings. A same numeral is given to a same component, and a name and a function thereof are the same. Therefore, detailed description thereof is not repeated.

Figure 1:
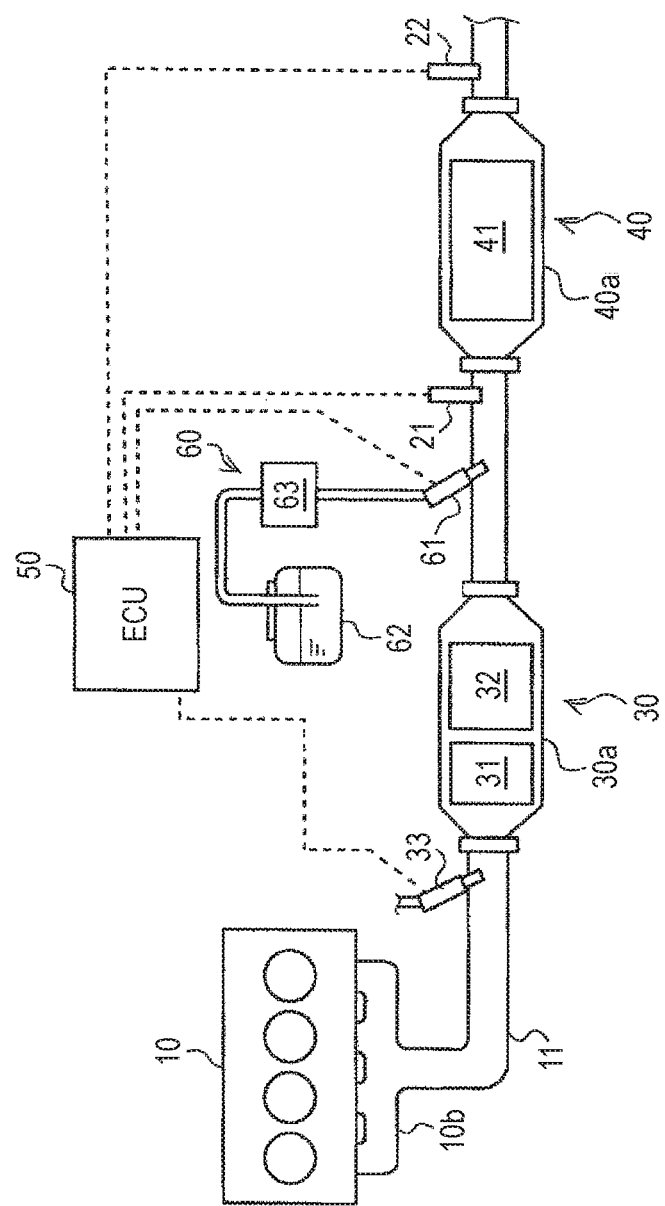
FIG. 1 is a schematic entire configuration view illustrating an exhaust gas purification system of an embodiment.

As illustrated in FIG. 1, an exhaust gas passage 11, which derives exhaust gas to the atmosphere, is connected to an exhaust gas manifold 10b of a diesel engine (hereinafter, simply referred to as engine) 10. In the exhaust gas passage 11, a pre-stage post processing device 30, a post-stage post processing device 40, and the like are provided sequentially from an upstream side of exhausting.

The pre-stage post processing device 30 is configured by disposing an oxidation catalyst (hereinafter, DOC) 31 and a DPF 32 sequentially from an upstream side inside a catalyst case 30a. In addition, a fuel ejecting device (fuel addition valve) 33 is provided in the exhaust gas passage 11 of an upstream side than a DOC 31.

The fuel ejecting device 33 ejects an unburned fuel (mainly, HC) inside the exhaust gas passage 11 according to an instruction signal input from an electronic control unit (hereinafter, ECU) 50. Here, in a case in which post-ejecting due to multi-stage ejection of the engine 10 is used, the fuel ejecting device 33 may be omitted.

For example, the DOC 31 is formed by carrying a catalyst component on a surface of a ceramic carrier of a cordierite honeycomb structure, or the like. When the HC is supplied by the fuel ejecting device 33 or the post-ejecting, the DOC 31 oxidizes the HC so that an exhaust gas temperature is increased.

For example, the DPF 32 is formed by disposing a plurality of cells divided using porous partition walls along a flowing direction of exhausting and alternately sealing an upstream side and a downstream side of the cells. The DPF 32 collects PM in the exhaust gas in fine pores or the surface of the partition walls and also performs so called forced regeneration in which the PM is combusted and removed when the amount of the PM collected reaches a predetermined amount. The forced regeneration is performed by supplying unburned fuel (HC) to the DOC 31 using the fuel ejecting device 33 or by the post-ejecting and increasing the exhaust gas temperature flowing into the DPF 32 to a PM combustion temperature.

The post-stage post processing device 40 is configured with a SCR 41 accommodated in a case 40a. In addition, a urea water ejection device 60 and an exhaust gas temperature sensor 21 are provided in the exhaust gas passage 11 on an upstream side than the SCR 41, and the NOx sensor 22 is provided in the exhaust gas passage 11 on a downstream side than the SCR 41.

The urea water ejection device 60 ejects the urea water which is pressure-transported by a urea water pump 63 from an inside of a urea water tank 62 into the exhaust gas passage 11 of an upstream side than the SCR 41 by opening and closing a urea addition valve 61 according to an instruction signal input from the ECU 50. The ejected urea water is hydrolyzed by exhausting heat so as to turn into NH3, and is supplied to the SCR 41 on a downstream side as a reducing agent.

For example, the SCR 41 is formed by carrying zeolite, or the like on a surface of a ceramic carrier of a honeycomb structure body, or the like, and is configured with the plurality of cells divided by the porous partition wall. The SCR 41 adsorbs the NH3 supplied as the reducing agent, and selectively reduces and purifies NOx from the exhaust gas being passed using the adsorbed NH3.

The exhaust gas temperature sensor 21 is an example of exhaust gas temperature acquiring means of the invention, and detects an exhaust gas temperature (hereinafter, SCR inlet temperature $TEMP_{IN}$) flowing into the SCR 41. The NOx sensor 22 detects a value of NOx in the exhaust gas (hereinafter, SCR outlet NOx value $NOx_{OUT}$) passing through the SCR 41. Sensor values of various sensors 21 and 22 are transmitted to the ECU 50 which is electrically connected.

Figure 2:
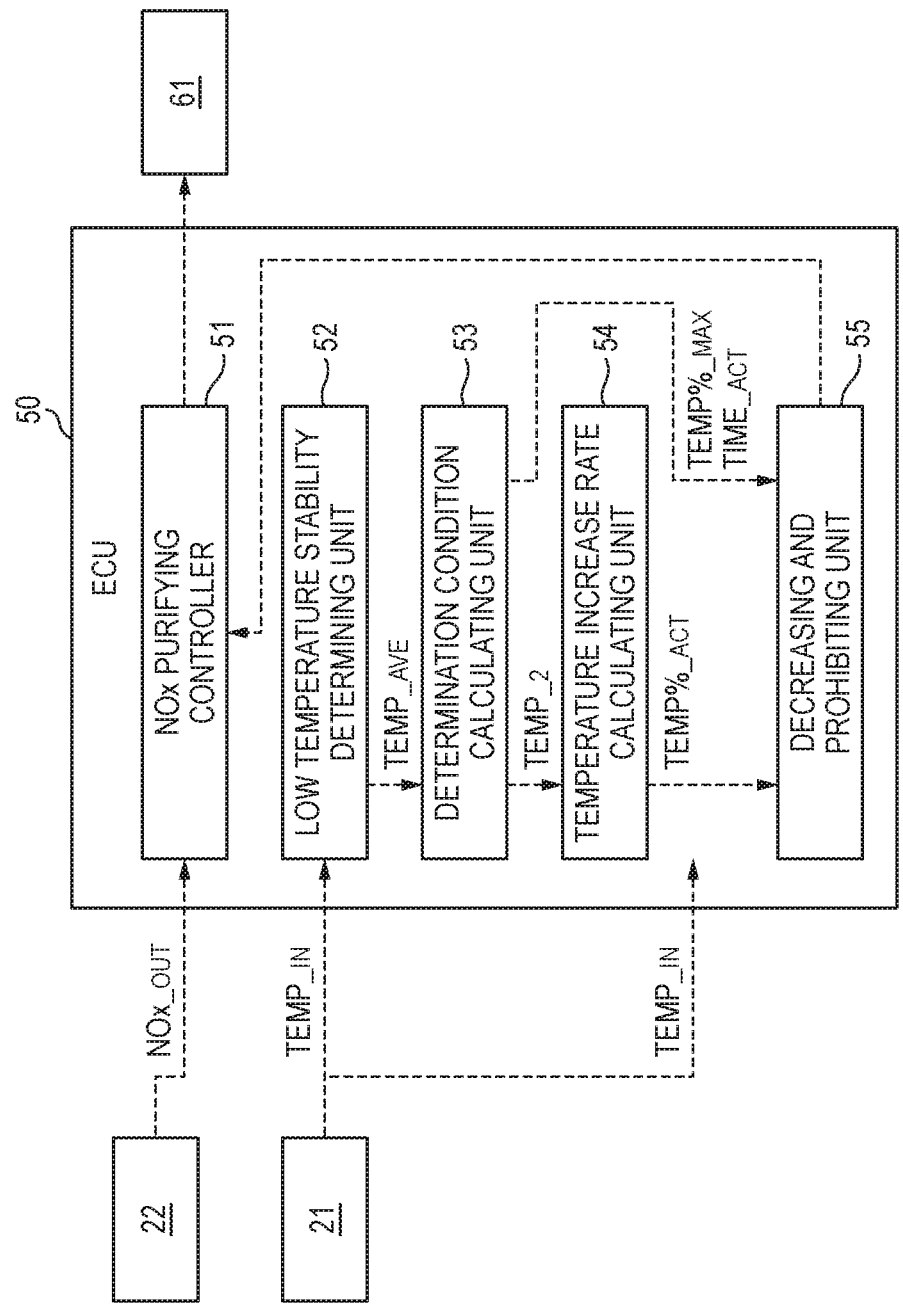
FIG. 2 is a functional block diagram illustrating an electronic control unit (ECU) of the embodiment.

The ECU 50 is a section that controls a variety of the devices such as the engine 10, or the fuel ejecting device 33, the urea water ejection device 60, and is configured with well-known CPU, ROM, RAM, input ports, output ports, and the like. In addition, as illustrated in FIG. 2, the ECU 50 includes a NOx purifying controller 51, a low temperature stability determining unit 52, a determination condition calculating unit 53, a temperature increasing rate calculating unit 54, and a decreasing and prohibiting unit 55 as partial functional elements. In the embodiment, the respective functional elements have described to be included in the ECU 50 which is integral hardware, but any part thereof can also be provided in separated hardware.

The NOx purifying controller 51 feedback-controls the amount of urea water being ejected from the urea water ejection device 60 based on the SCR outlet NOx value $NOx_{OUT}$ input from the NOx sensor 22. In addition, the NOx purifying controller 51 also performs an abnormality diagnosis of which an alarm is issued when the NOx sensor 22 detects an abnormal value due to significant deterioration of a NOx purifying performance of the SCR 41, failure of the urea addition valve 61, or the like.

Figure 3:
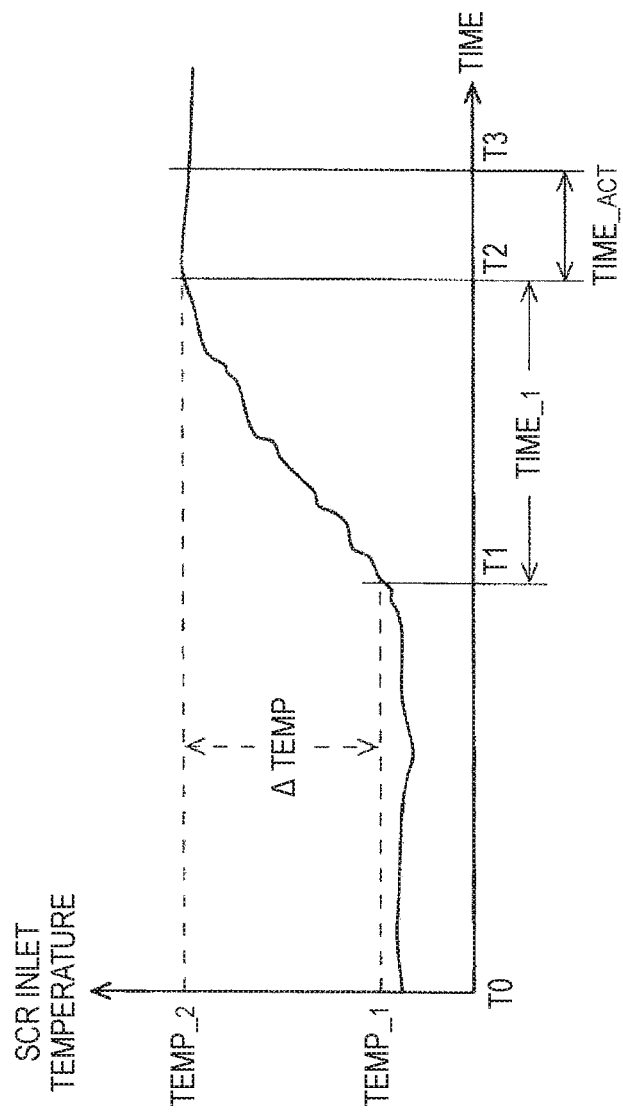
FIG. 3 is a time chart describing low temperature determination, temperature increasing rate determination, decreasing of an amount of urea water being ejected, and prohibition of abnormality diagnosis by the exhaust gas purification system of the embodiment.

The low temperature stability determining unit 52 determines whether or not the exhaust gas temperature flowing into the SCR 41 is stabled in a predetermined low temperature state based on the SCR inlet temperature $TEMP_{IN}$ input from the exhaust gas temperature sensor 21. In more details, the low temperature stability determining unit 52 calculates an average temperature $TEMP_{AVE}$ (movement average) within a predetermined period in real time by averaging the SCR inlet temperature $TEMP_{IN}$ detected by the exhaust gas temperature sensor 21 within the predetermined period. In addition, if the calculated average temperature $TEMP_{AVE}$ is equal to or less than a predetermined low temperature determination temperature $TEMP_1$ (refer to time T0 to T1 of FIG. 3), it is determined that the exhaust gas temperature flowing into the SCR 41 is stabled at a low temperature. Here, it is preferable that the low temperature determination temperature $TEMP_1$ be set within a range of, for example, substantially 190° C. to 200° C.

The determination condition calculating unit 53 calculates (1) a high temperature determining temperature $TEMP_2$, (2) an upper limit temperature increasing rate $TEMP\%_{MAX}$, (3) a longest waiting time $TIME_{UP}$, and (4) a processing prohibition time $TIME_{ACT}$ which are used for high temperature determination, ejecting amount decreasing diagnosing prohibition, or the like to be described later, when the temperature is determined to be stabled at a low temperature by the low temperature stability determining unit 52.

The high temperature determining temperature $TEMP_2$ is an exhaust gas temperature right before the NH3 slip occurs in the SCR 41, and is calculated according to the average temperature $TEMP_{AVE}$. The upper limit temperature increasing rate $TEMP\%_{MAX}$ is an exhaust gas temperature increasing rate where the NH3 slip may occur in the SCR 41, and is calculated according to the average temperature $TEMP_{AVE}$. A longest waiting time $TIME_{UP}$ is a waiting time for initializing the high temperature determining temperature $TEMP_2$ in a case in which the exhaust gas temperature does not reach the high temperature determining temperature $TEMP_2$, and is calculated according to the average temperature $TEMP_{AVE}$, or is set as an arbitrary time determined in advance. The processing prohibition time $TIME_{ACT}$ is a time for decreasing the amount of urea water being ejected and prohibiting the abnormality diagnosis in order to prevent additional NH3 slip or misdiagnosis at the time of rapidly increasing of the exhaust gas temperature, and is set to be longer as the average temperature $TEMP_{AVE}$ is lower.

The temperature increasing rate calculating unit 54 calculates a temperature increasing rate when the SCR inlet temperature $TEMP_{IN}$ detected by the exhaust gas temperature sensor 21 is increased from the low temperature determination temperature $TEMP_1$ to the high temperature determining temperature $TEMP_2$. In more details, a reaching time $TIME_1$ (refer to time T1 to T2 of FIG. 3) from a timing when the SCR inlet temperature $TEMP_{IN}$ detected by the exhaust gas temperature sensor 21 exceeds the low temperature determination temperature $TEMP_1$ until it readies the high temperature determining temperature $TEMP_2$ is counted by a built-in timer of the ECU 50, and a temperature increasing width $\Delta TEMP$ of which the low temperature determination temperature $TEMP_1$ is subtracted from the high temperature determining temperature $TEMP_2$ is divided by the reaching time $TIME_1$, and therefore an actual temperature increasing rate $TEMP\%_{ACT}$ is calculated.

In a case in which there is a possibility of occurrence of the NH3 slip, the decreasing and prohibiting unit 55 decreases the amount of urea water being ejected by the NOx purifying controller 51 and prohibits the abnormality diagnosis. In more details, when the actual temperature increasing rate $TEMP\%_{ACT}$ calculated by the temperature increasing rate calculating unit 54 is equal to or more than the upper limit temperature increasing rate $TEMP\%_{MAX}$ at which there is the possibility of occurrence of the NH3 slip, the decreasing and prohibiting unit 55 decreases the amount of urea water being ejected and prohibits the abnormality diagnosis, from a timing when the SCR inlet temperature $TEMP_{IN}$ exceeds the high temperature determining temperature $TEMP_2$ until the processing prohibition time $TIME_{ACT}$ elapses (refer to time of T2 to T3 FIG. 3). Accordingly, the NH3 slip or the misdiagnosis at the time of rapidly increasing the exhaust gas temperature is effectively prevented.

Figure 4:
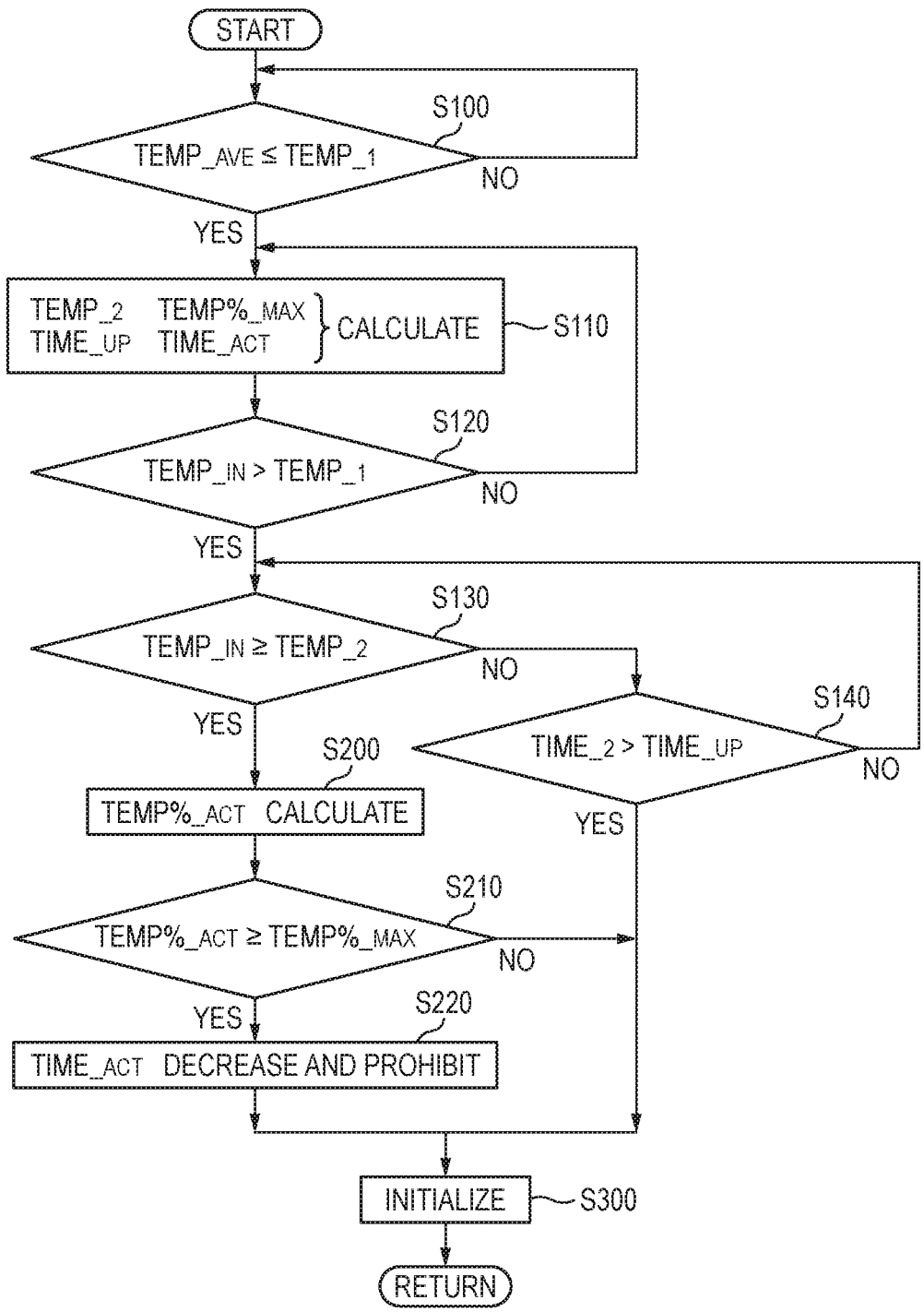
FIG. 4 is a flow chart illustrating an example of control contents by the exhaust gas purification system of the embodiment.

Next, based on FIG. 4, a control flow using the exhaust gas purification system of the embodiment will be described. Also, the flow of FIG. 4, a urea water ejection control and an abnormality diagnosis are performed simultaneously by the NOx purifying controller 51.

In Step (hereinafter, Step is simply disclosed as S) 100, it is determined whether or not the exhaust gas temperature flowing into the SCR 41 is stabled in a predetermined low temperature state based on the average temperature $TEMP_{AVE}$ which is obtained by taking a moving average of the SCR inlet temperature $TEMP_{IN}$ detected by the exhaust gas temperature sensor 21 within a predetermined period. In a case in which the average temperature $TEMP_{AVE}$ is equal to or less than the low temperature determination temperature $TEMP_1$ (Yes), the exhaust gas temperature flowing into the SCR 41 is determined to be stabled at a lower temperature, and the control proceeds to S110.

In S110, based on the average temperature $TEMP_{AVE}$ of a low temperature state detected in S100, (1) the high temperature determining temperature $TEMP_2$ used for high temperature determination, or the like, (2) the upper limit temperature increasing rate $TEMP\%_{MAX}$, (3) the longest waiting time $TIME_{UP}$, and (4) the processing prohibition time $TIME_{ACT}$ are calculated.

In S120, it is determined whether or not the SCR inlet temperature $TEMP_{IN}$ detected by the exhaust gas temperature sensor 21 exceeds the low temperature determination temperature $TEMP_1$. In a case in which the SCR inlet temperature $TEMP_{IN}$ exceeds the low temperature determination temperature $TEMP_1$ (Yes), the control proceeds to S130 in which counting using a timer is started.

In S130, it is determined that whether or not the SCR inlet temperature $TEMP_{IN}$ detected by the exhaust gas temperature sensor 21 reaches the high temperature determining temperature $TEMP_2$. In a case in which the SCR inlet temperature $TEMP_{IN}$ does not reach the high temperature determining temperature $TEMP_2$ (No), the control proceeds to S140.

In S140, it is determined that whether or not a counting time $TIME_2$ of a timer started from S120 reaches the longest waiting time $TIME_{UP}$. In a case in which the counting time $TIME_2$ reaches the longest waiting time $TIME_{UP}$ (Yes), the temperature is gradually increased, and thus a possibility of the occurrence of the NH3 slip is low. Therefore, the control proceeds to S300, various determination conditions calculated in S110 are initialized, and returned.

In S130, in a case in which the SCR inlet temperature $TEMP_{IN}$ reaches the high temperature determining temperature $TEMP_2$ (Yes), the process proceeds to S200. In S200, by dividing the temperature increasing amount $\Delta TEMP$ (=TEMP 2−TEMP 1) from S120 to S130 by the reaching time $TIME_1$ counted using the timer, the actual temperature increasing rate $TEMP\%_{ACT}$ is calculated.

In S210, determination of whether or not there is a possibility of occurrence of the NH3 slip in the SCR 41 due to rapid increasing of temperature is performed. When the actual temperature increasing rate $TEMP\%_{ACT}$ calculated in S200 is less than the upper limit temperature increasing rate $TEMP\%_{MAX}$ (No), the temperature is gradually increased, and thus a possibility of the occurrence of the NH3 slip is low. Therefore, the control proceeds to S300, various determination conditions calculated in S110 are initialized, and returned. Meanwhile, when the actual temperature increasing, rate TEMP%$_{ACT}$ is equal to or more than the upper limit temperature increasing rate TEMP %$_{MAX}$ (Yes), since a possibility of NH3 slip is high, the control proceeds to S220.

In S220, in order to prevent occurrence of excess NH3 slip or misdiagnosis due to rapidly increased temperature, from a timing of S130 until the processing prohibition time TIME$_{ACT}$ elapses, the amount of urea water being ejected by the NOx purifying controller 51 is decreased and the abnormality diagnosis is prohibited. After that, when the processing prohibition time TIME$_{ACT}$ elapses, the control proceeds to S300, various determination conditions calculated in S110 are initialized, and returned.

Next, effects of the exhaust gas purification system according to the embodiment will be described.

When the exhaust gas temperature is rapidly increased from a low temperature to a high temperature (refer to time T1 to T2 of (A) of FIG. 5) such as at a time of starting the DPF forced regeneration, the NH3 slip occurs due to deterioration of NH3 adsorbing performance of the SCR 41 (refer to region A of (A) of FIG. 5). Since the NOx sensor 22 is not capable of distinguishing NH3 from NOx, in a system in which the amount of urea water being ejected is feedback-controlled based on the sensor value of the NOx sensor 22, a NOx value higher than an actual NOx value may be falsely recognized and the amount of urea water being ejected may be increased (refer to time T2 to 13 of (A) of FIG. 5), thereby causing an additional NH3 slip.

In addition, when the excess NH3 slip is generated due to rapid increase in the exhaust gas temperature (refer to region A of (B) of FIG. 5), the NOx sensor 22 which is not capable of distinguishing NH3 from NOx detects an abnormal value (refer to B point of (B) of FIG. 5). Therefore, in a system in which the abnormality diagnosis is performed based on the sensor value of the NOx sensor 22, there is a possibility that the NOx is falsely recognized to be excessively discharged, and misdiagnosis such as stop of the urea water ejection (refer to timing T3 of (B) of FIG. 5), or issuing an alarm may be performed.

When the actual temperature increasing rate TEMP%$_{ACT}$, at which the SCR inlet temperature TEMP$_{IN}$ reaches the high temperature determining temperature TEMP$_2$ from the low temperature determination temperature TEMP$_1$, is equal to or more than the upper limit temperature increasing rate TEMP %$_{MAX}$ indicating a possibility of the NH3 slip, the exhaust gas purification system of the embodiment is configured to decrease the amount of urea water being ejected and prohibit the abnormality diagnosis until the processing prohibition time TIME$_{ACT}$ elapses. Therefore, it is possible to surely prevent the occurrence of the NH3 slip and misdiagnosis at the time of rapid increasing of the exhaust gas temperature, such as at a time of the DPF forced regeneration. In addition, since excess ejection of the urea water can be prevented, corrosion of an exhausting gas pipe or performance deterioration of the SCR 41 caused by attaching of the urea water, or the like can be effectively suppressed.

Here, the invention is not limited to the above described embodiment, and appropriately modified and performed without departing from the spirit of the inventions.

For example, although the amount of urea water being ejected is decreased in a case in which there is a possibility of the NH3 slip, the urea water ejection may be temporarily stopped in a case in which an amount of adsorbing the NH3 of the SCR 41 is close to the absorbable amount. In addition, the engine 10 is not limited to a diesel engine, and can be widely applied for other internal combustion engines such as a gasoline engine.

The invention claimed is:

1. An exhaust gas purification system comprising:
a selective catalytic reduction which is provided on an exhaust gas passage of an internal combustion engine and purifies NOx in exhaust gas by using ammonia generated from urea water as a reducing agent;
an NOx sensor which is provided on the exhaust gas passage on downstream side further than the selective catalytic reduction;
control means for controlling an amount of urea water being ejected to the selective catalytic reduction and performing an abnormality diagnosis based on a detection value of the NOx sensor,
means for acquiring temperature of the exhaust gas flowing into the selective catalytic reduction;
wherein an electronic control unit is configured to perform calculating a temperature increasing rate at which an exhaust gas temperature acquired by the exhaust gas temperature acquiring means reaches a predetermined second temperature, which is higher than a predetermined first temperature, from the first temperature; and to perform prohibiting the abnormality diagnosis by the control means in a case in which the temperature increasing rate calculated by the electronic control unit is higher than a predetermined determination threshold value.

2. The exhaust gas purification system according to claim 1, wherein the electronic control unit is further configured for:
calculating an average temperature obtained by averaging exhaust gas temperatures acquired within a predetermined period by the exhaust gas temperature acquiring means, and determining that the temperature is stabled at a low temperature when the average temperature is equal to or less than the first temperature,
wherein the electronic control unit is further configured to start calculating of the temperature increasing rate when it is determined that the temperature is stabled at a low temperature and the exhaust gas temperature acquired by the exhaust gas temperature acquiring means exceeds the first temperature.

3. The exhaust gas purification system according to claim 2, further comprising:
the electronic control unit is configured for decreasing the amount of urea water being ejected by the control means in a case in which the temperature increasing rate calculated by the electronic control unit is higher than a predetermined determination threshold value,
wherein the electronic control unit is configured to continuously perform prohibition of the abnormality diagnosis for a predetermined period set according to the average temperature, and the electronic control unit is further configured to continuously performs decreasing of the amount of urea water being ejected for the predetermined period set according to the average temperature.

4. The exhaust gas purification system according to claim 3,
wherein the electronic control unit is configured to not perform prohibition of the abnormality diagnosis in a case in which the exhaust gas temperature acquired by the exhaust gas temperature acquiring means does not reach the second temperature from the first temperature within a predetermined waiting time, and wherein the electronic control unit is further configured to not perform decreasing of the amount of urea water being ejected in a case in which the exhaust gas temperature acquired by the exhaust gas temperature acquiring means does not reach the second temperature from the first temperature within a predetermined waiting time.

5. The exhaust gas purification system according to claim 1,
wherein the second temperature is set to a lower temperature than a temperature at which ammonia adsorbed to the selective catalytic reduction is at least partially separated and slipped.

6. An exhaust gas purification system comprising:
a selective catalytic reduction which is provided on an exhaust gas passage of an internal combustion engine and purifies NOx in exhaust gas by using ammonia generated from urea water as a reducing agent;
an NOx sensor which is provided on the exhaust gas passage on downstream side further than the selective catalytic reduction;
an exhaust gas temperature sensor which acquires temperature of the exhaust gas flowing into the selective catalytic reduction; and
a electronic control unit configured to:
control an amount of urea water being ejected to the selective catalytic reduction and perform an abnormality diagnosis based on a detection value of the NOx sensor;
calculate a temperature increasing rate at which an exhaust gas temperature acquired by the exhaust gas temperature sensor reaches a predetermined second temperature, which is higher than a predetermined first temperature, from the first temperature; and
prohibit the abnormality diagnosis in a case in which the calculated temperature increasing rate is higher than a predetermined determination threshold value.

7. The exhaust gas purification system according to claim 6,
wherein the electronic control unit is further configured to:
calculate an average temperature obtained by averaging exhaust gas temperatures acquired within a predetermined period by the exhaust gas temperature sensor, and determine that the temperature is stabled at a low temperature when the average temperature is equal to or less than the first temperature, and
wherein the calculating of the temperature increasing rate is started when determined that the temperature is stabled at a low temperature and the exhaust gas temperature acquired by the exhaust gas temperature sensor exceeds the first temperature.

8. The exhaust gas purification system according to claim 7,
wherein the electronic control unit is further configured to:
decrease the amount of urea water being ejected in a case in which the calculated temperature increasing rate is higher than a predetermined determination threshold value, and
wherein the prohibition of the abnormality diagnosis is continuously performed for a predetermined period set according to the average temperature, and decreasing of the amount of urea water being ejected is continuously performed for the predetermined period set according to the average temperature.

9. The exhaust gas purification system according to claim 8,
wherein the prohibition of the abnormality diagnosis is not performed in a case in which the exhaust gas temperature acquired by the exhaust gas temperature sensor does not reach the second temperature from the first temperature within a predetermined waiting time, and
wherein decreasing of the amount of urea water being ejected is not performed in a case in which the exhaust gas temperature acquired by the exhaust gas temperature sensor does not reach the second temperature from the first temperature within a predetermined waiting time.

10. The exhaust gas purification system according to claim 6,
wherein the second temperature is set to a lower temperature than a temperature at which ammonia adsorbed to the selective catalytic reduction is at least partially separated and slipped.

* * * * *